United States Patent [19]

Lambregts

[11] Patent Number: 5,016,177
[45] Date of Patent: May 14, 1991

[54] AIRCRAFT FLIGHT PATH ANGLE DISPLAY SYSTEM

[75] Inventor: Antonius A. Lambregts, Issaquah, Wash.

[73] Assignee: The Boeing Company, Seattle, Wash.

[21] Appl. No.: 499,290

[22] Filed: May 31, 1983

[51] Int. Cl.$^5$ .................................................. G06F 15/50
[52] U.S. Cl. ............................. 364/424.06; 364/427; 364/428; 340/976; 244/181
[58] Field of Search ............... 364/430, 427, 428, 434, 364/441; 244/175, 179, 180, 181, 184, 185, 183, 186; 318/583, 584; 340/951, 967, 973, 974, 976

[56] References Cited

U.S. PATENT DOCUMENTS

| | | | |
|---|---|---|---|
| 2,896,145 | 7/1959 | Snodgrass | 318/584 |
| 3,077,557 | 2/1960 | Joline et al. | 318/584 |
| 3,106,903 | 10/1963 | Bentkowsky et al. | 114/332 |
| 3,126,474 | 3/1964 | Zweibel et al. | 364/559 |
| 3,147,424 | 9/1964 | Miller | 244/180 X |
| 3,422,418 | 1/1969 | Simoneau | 244/175 X |
| 3,473,007 | 10/1969 | Seacy et al. | 364/427 |
| 3,529,283 | 9/1970 | Emerson et al. | 340/973 |
| 3,668,622 | 6/1972 | Gannett et al. | 340/721 |
| 3,686,626 | 8/1972 | Bateman et al. | 244/181 X |
| 3,688,175 | 8/1972 | Rauschelbach | 244/181 |
| 3,887,148 | 6/1975 | Devlin | 244/186 |
| 3,920,966 | 11/1975 | Knemeyer et al. | 364/190 |
| 3,970,829 | 7/1976 | Melvin | 364/434 |
| 4,027,839 | 6/1977 | Quinlivan | 244/195 |
| 4,040,005 | 8/1977 | Melvin | 340/973 |
| 4,044,975 | 8/1977 | Blechen et al. | 244/181 |
| 4,104,612 | 8/1977 | Lowe | 364/428 X |
| 4,283,705 | 8/1981 | James et al. | 340/973 |
| 4,373,184 | 2/1983 | Lambregts | 364/434 |

Primary Examiner—Parshotam S. Lall
Assistant Examiner—Thomas G. Black
Attorney, Agent, or Firm—James P. Hamley; B. A. Donahue

[57] ABSTRACT

A display system for use in an aircraft control wheel steering system provides the pilot with a single, quickened flight path angle display to overcome poor handling qualities due to intrinsic flight path angle response lags, while avoiding multiple information display symbology. The control law for the flight path angle control system is designed such that the aircraft's actual flight path angle response lags the pilot's commanded flight path angle by a constant time lag $\tau$, independent of flight conditions. The synthesized display signal is produced as a predetermined function of the aircraft's actual flight path angle, the time lag $\tau$ and command inputs from the pilot's column.

8 Claims, 4 Drawing Sheets

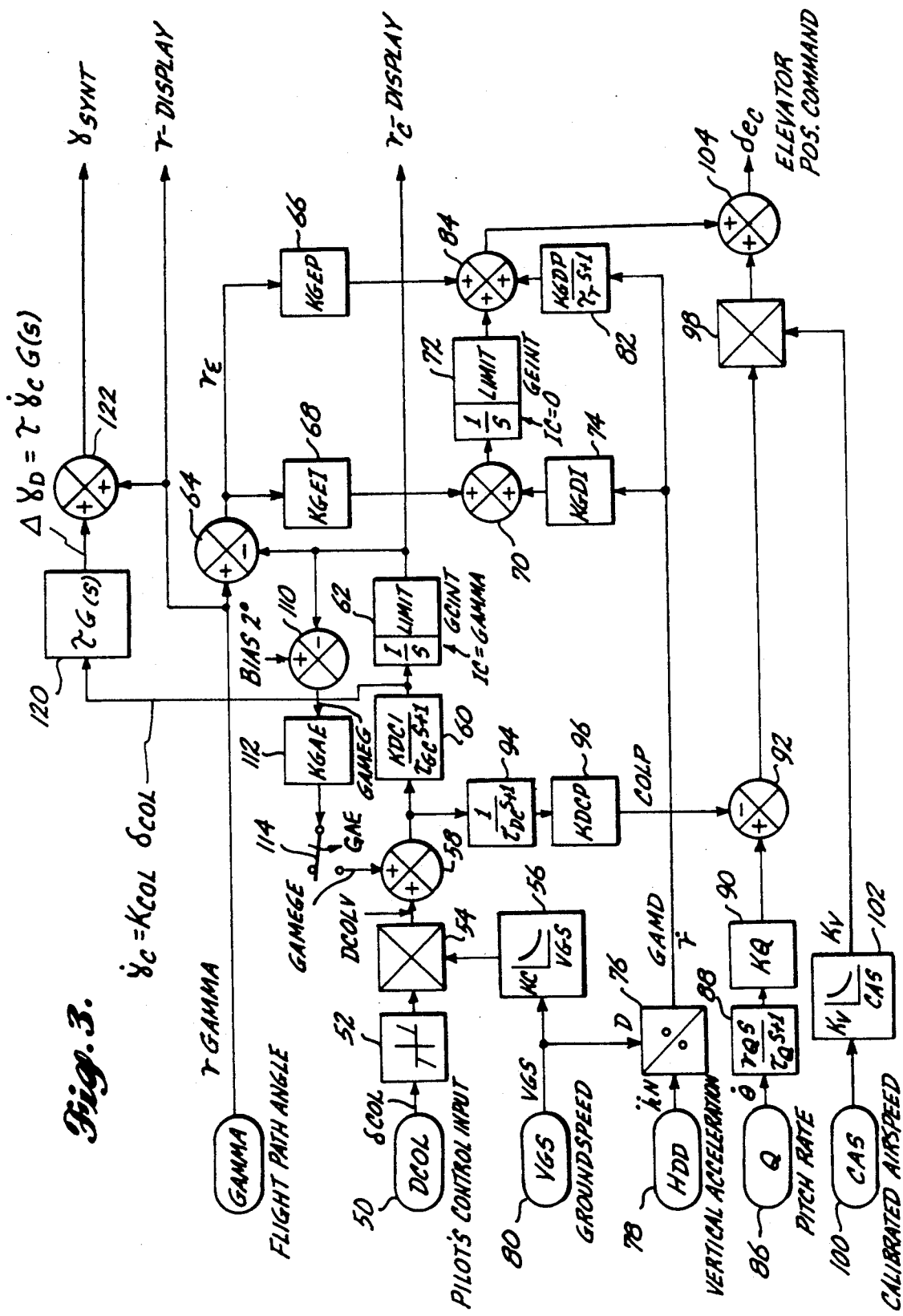

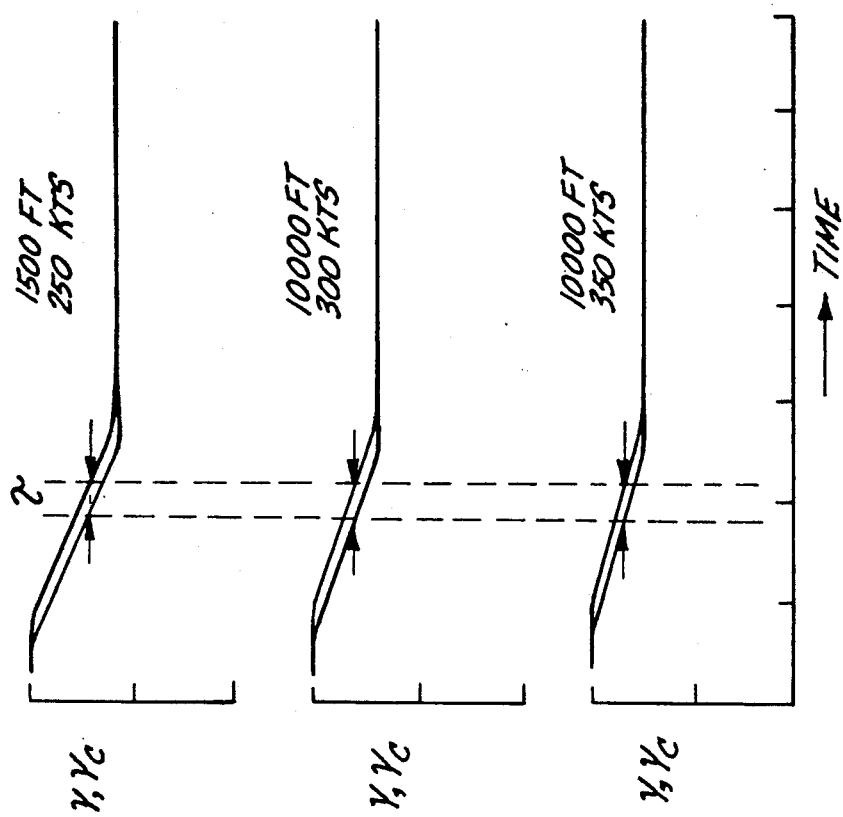
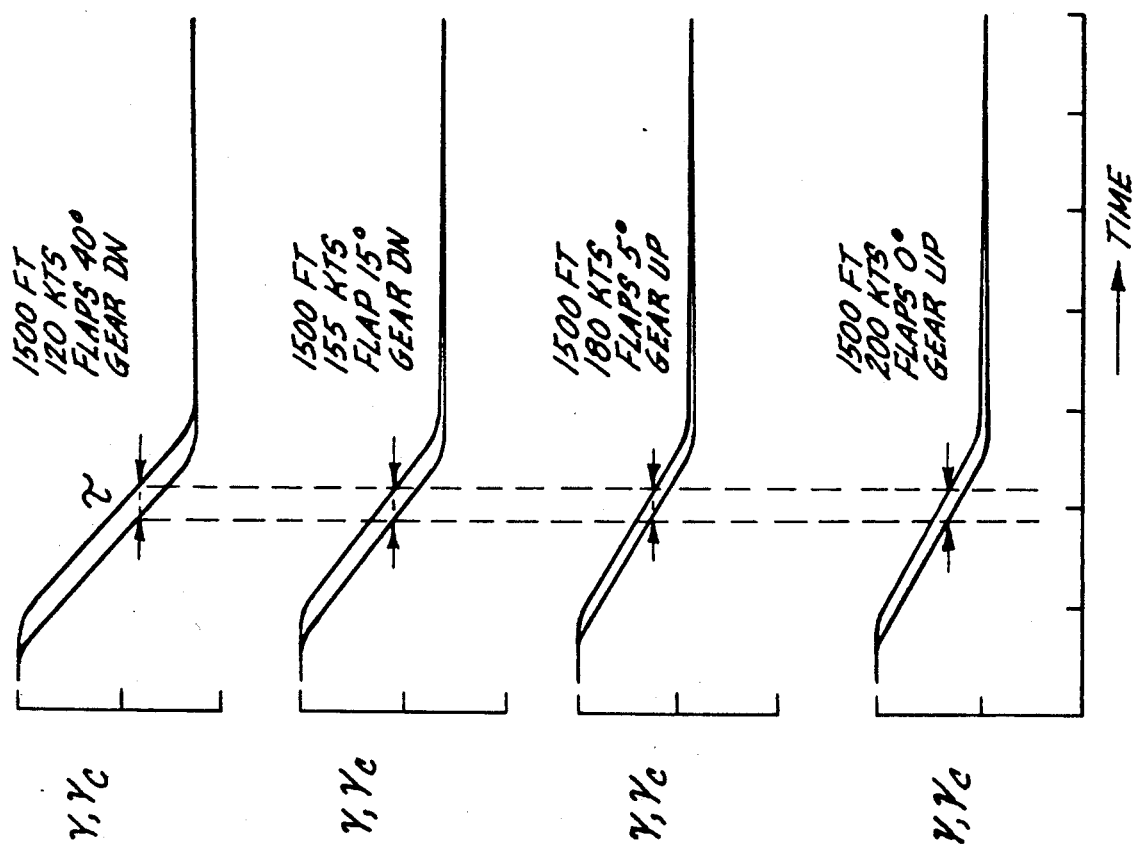
Fig. 4.

AIRCRAFT FLIGHT PATH ANGLE DISPLAY SYSTEM

The invention described herein was made in the the performance of work under a NASA contract No. NAS1-14880 and is subject to the provisions of Section 305 of the National Aeronautics and Space Act of 1948, Public Law 85-568(72 Stat.435; 42 USC 2457).

BACKGROUND OF THE INVENTION

This invention pertains to the aircraft control and display art and, more particularly, to a system providing a quickened flight path angle display for use in conjunction with a computer augmented manual flight path angle control system to overcome poor handling qualities due to intrinsic flight path angle response lags.

Such a controlled system, referred to as a "Velocity Vector Control Wheel Steering System" (VCWS) is disclosed in U.S. Pat. No. 4,373,184, issued Feb. 8, 1983, invented by the same inventor as the present application, and assigned to the same assignee. This system allows a pilot to input a commanded flight path angle $\gamma_C$ via his control column, with this commanded flight path angle being captured in a well-damped, overshoot free way.

FIG. 1 illustrates the indicator 10 used in association with the flight control system in the above-referenced velocity control wheel steering system patent. The principle feature of the display 10 is that simultaneous indications 30, 32 represent both the flight path angle command $\gamma_C$ and the aircraft's actual flight path angle $\gamma$, respectively.

Various pitch lines 24-26 are indicated on the screen along with a reference airplane symbol 28.

A landing system glide slope indicator 16 is provided with an appropriate scale indicated generally at 18.

A roll pointer 12 indicates roll attitude relative to a suitable roll attitude scale, indicated generally at 14.

A landing system localizer indicator 20 is provided with an appropriate scale indicated generally at 22.

During tracking conditions in the VCWS mode both symbols overlay. The value of the flight path angle is read against the pitch scale. The pitch attitude is determined by the airplane symbol position relative to this scale, with a 5° noseup bias being applied to unclutter the symbology. For example, when flying level, the flight path angle wedges 30, 32 overlay and point at the 0° (horizon) line 33. During a column input, the response of the $\gamma_C$ symbol 30 leads the $\gamma$ symbol 32 in proportion to the amplitude of the column input (and thus $\dot{\gamma}_C$). When the column input is returned to neutral, the actual flight path angle $\gamma$ closes in on the commanded flight path angle $\gamma_C$ in a quick and well-damped way.

Whereas the above-described display provides a positive means for indicating to the pilot his commanded, as well as actual flight path angle, further research in the development of a suitable display configuration for the velocity control wheel steering system has indicated that a single symbol containing the pertinent information of both $\gamma$ and $\gamma_C$ is desirable. Such a single symbol would reduce the number of symbols presented to the pilot, thus tending to unclutter the display to the pilot, as well as preventing the possibility of the pilot confusing the actual flight path indicator with the commanded flight path indicator, and inadvertenly deviating from a desired flight course.

SUMMARY OF THE INVENTION

It is desirable, therefore, to provide an indicator system for use with a velocity control wheel steering system, which indicator system incorporates the pertinent information of the actual flight path angle $\gamma$ and the commanded flight path angle $\gamma_C$ into a single symbol.

Briefly, according to the invention, a method for producing a flight path angle display for an aircraft comprises the first step of providing an aircraft flight control steering system which has a predetermined response lag $\tau$ to a command input, this time lag being independent of flight conditions. A signal $\gamma$ is provided representative of the aircraft's flight path angle. A signal $\Delta \gamma_D$ is produced, which signal has a predetermined relationship to the response lag $\tau$ and to a flight path angle command. A synthesized signal $\gamma_{SYNT}$ is produced, where:

$$\gamma_{SYNT} = \gamma + \Delta \gamma_D$$

The signal $\gamma_{SYNT}$ is displayed to the pilot as the single symbol for aircraft flight path angle control.

An aircraft flight path control and display system includes control means responsive to a flight path command to automatically control the flight of the aircraft to the commanded path. The control means exhibits a time response lag $\tau$ between flight path command input and the response of the aircraft's actual flight path. This time lag $\tau$ is substantially independent of flight conditions. A means provides a signal $\gamma$ representative of the aircraft's actual flight path angle. A signal $\Delta \gamma_D$ is produced, which signal is a predetermined function of the response lag $\tau$ and the first time derivative of the commanded flight path angle. A signal $\gamma_{SYNT}$ is produced, where:

$$\gamma_{SYNT} = \gamma + \Delta \gamma_D$$

The signal $\gamma_{SYNT}$ is displayed to the pilot as the single symbol for flight path angle control.

BRIEF DESCRIPTION OF THE DRAWINGS

FIG. 3 is a detailed schematic diagram of the control law and preferred means for generating the single symbol display according to the invention;

FIG. 4 depicts the constant time lag $\tau$ between commanded and actual flight path angles for the system of FIG. 3 under various flight conditions; and, FIG. 5 illustrates the single symbol flight path angle display when used with an electronic attitude director indicator.

DETAILED DESCRIPTION OF THE INVENTION

Figure 1:
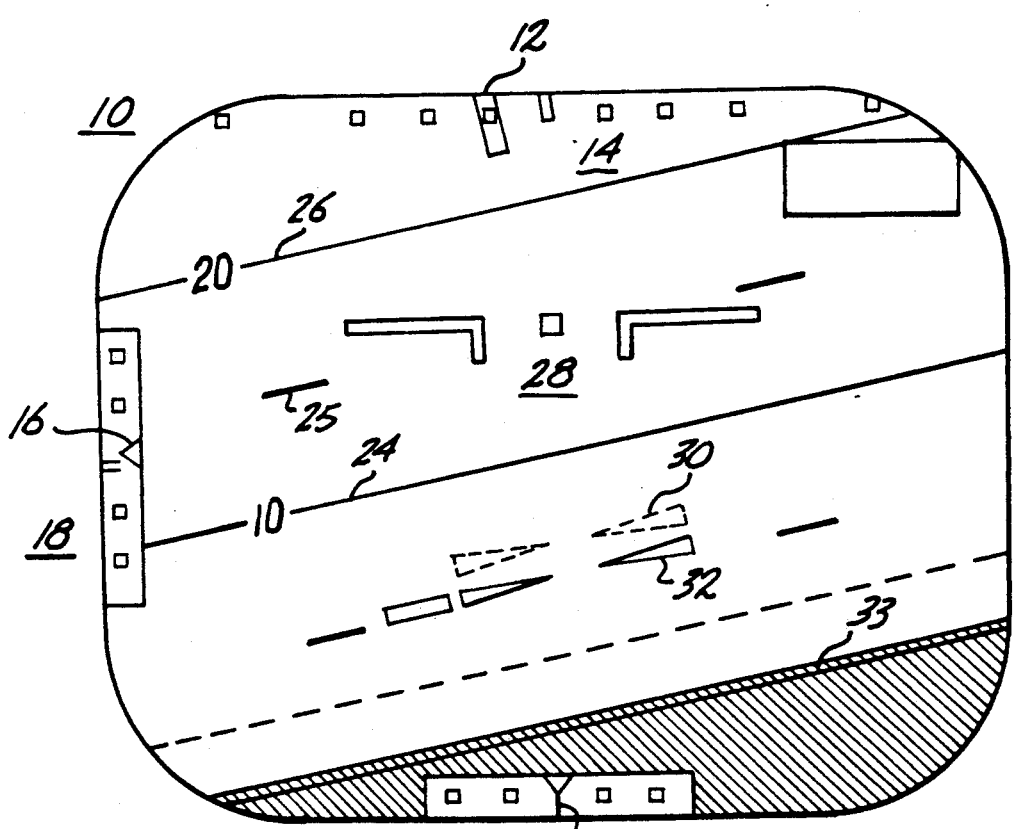
FIG. 1 illustrates a prior electronic attitude director indicator, depicting a display for both the actual, and the commanded flight path angles.

FIG. 1 illustrates an electronic attitude director indicator used to display indications of both flight path angle and commanded flight path angle, as employed in a prior indicating system, discussed fully hereinabove.

Figure 2B:
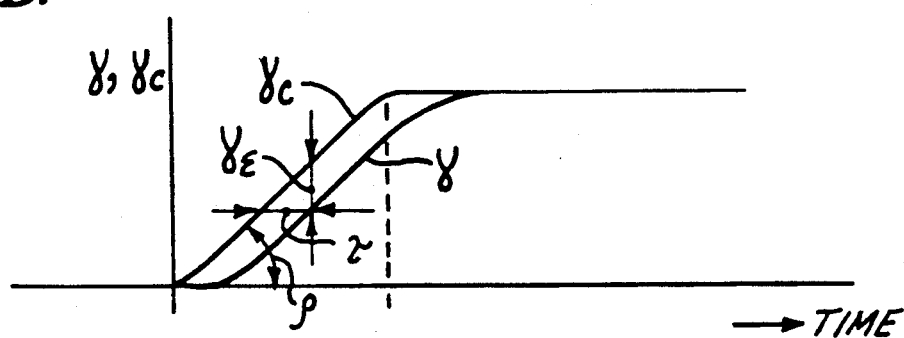
FIGS. 2A and 2B illustrate the response of the aircraft's actual flight path angle $\gamma$ and the commanded flight path angle $\gamma_C$ to a pilot's control column command input $\delta_{COL}$.
Figure 2A:
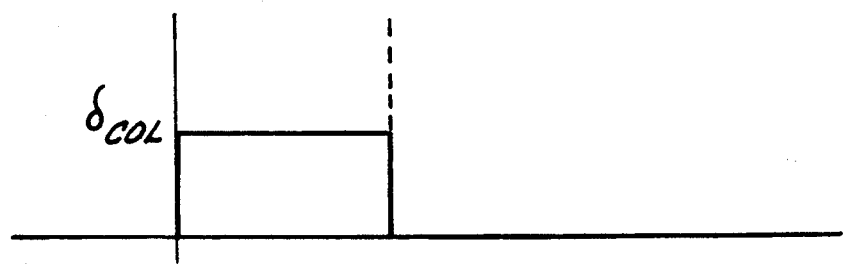

FIG. 2A illustrates a pilot's control column input signal $\delta_{COL}$ required to establish a new flight path angle.

FIG. 2B illustrates the response of the velocity control wheel steering system to a control column input signal. The control column signal is filtered and integrated to produce the commanded flight path angle $\gamma_C$. The $\gamma_C$ signal and the actual flight path angle signal $\gamma$ are processed together with the column signal $\delta_{COL}$ to control the aircraft's elevator in such a way that the actual flight path angle lags the commanded flight path angle $\gamma_C$ by a time factor $\tau$. The elevator command computation is further designed to yield a rate of change of $\gamma$ equal to the rate of change of $\gamma_C$, for constant $\delta_{COL}$.

The flight path angle error is:

$$\gamma_\epsilon = \gamma_C - \gamma. \tag{1}$$

Further, $$\gamma_\epsilon = \tau \text{ TAN } \rho \text{ and TAN } \delta = \dot{\gamma}. \tag{2}$$

Therefore, $$\gamma_\epsilon = \tau \dot{\gamma}, \tag{3}$$

where $\dot{\gamma}$ represents the first time derivative of flight path angle.

From the above relationship, it can be seen that if the response lag can be made constant for all flight conditions, then:

$$\dot{\gamma} = \dot{\gamma}_C G(s), \tag{4}$$

where $\dot{\gamma}_C$ is the first time derivative of commanded flight path angle and G(s) is a fixed transfer function of s, the Laplace operator, yielding the response lag $\tau$ between $\gamma$ and $\gamma_C$.

Then, $$\gamma_\epsilon = \tau \dot{\gamma}_C G(s), \tag{5}$$

and since $$\dot{\gamma}_C = K_{COL} \delta_{COL} \tag{6}$$

(where $K_{COL}$ is a predetermined constant),
it therefore follows that:

$$\gamma_\epsilon = \tau K_{COL} \delta_{COL} G(s). \tag{7}$$

A signal $\Delta \gamma_D = \tau K_{COL} \delta_{COL} G(s)$ can, therefore, be developed, which signal is equal to $\gamma_\epsilon$ during the periods of column input.

A display signal $\gamma_{SYNT}$ can, therefore, be synthesized from $\gamma$ and $\delta_{COL}$, which display signal is equivalent to $\gamma_C$ during transient column inputs and which reverts to actual $\gamma$ during periods with the column in detent, i.e., $\delta_{COL} = 0$. Thus, $$\gamma_{SYNT} = \gamma + \Delta \gamma_D \tag{8}$$

and, from equation (7) above, $$\gamma_{SYNT} = \gamma + \tau K_{COL} \delta_{COL} G(s) \tag{9}$$

FIG. 3 is a detailed schematic diagram illustrating the preferred construction of the control law circuit, and the circuitry for generating the single flight path angle symbol $\gamma_{SYNT}$. The pilot's column signal input $\delta_{COL}$, generated by conventional sensors and appearing at an input 50, is processed through a dead zone circuit 52.

Dead zone circuit 52 assures that the signal input to the control law is zero when the column is in the neutral position. The signal output from dead zone circuit 52 is multiplied by a gain factor KC in a multiplier circuit 54 producing a signal DCOLV. This gain factor signal KC is produced as a predetermined function of ground speed VGS in a function generating circuit 56, according to the relationship KC=VO/VGS, where VO represents a suitable normalization constant.

The speed programmed column signal DCOLV is summed with a signal GAMEGE in a summer 58 before being used in two signal paths. This GAMEGE signal is normally zero and its function is described in connection with the GO AROUND feature of the control law. In the first signal path, the output of summer 58 is amplified and lagged in a circuit 60, and then integrated in integrator 62 to produce the signal $\gamma_C$ representative of the commanded flight path angle. A pilot control column input thus results in a rate of change of the signal $\gamma_C$ which is proportional to the column position and inversely proportional to speed. This inverse speed relationship is provided to achieve proper column sensitivity over the entire aircraft speed range. It is desirable to maintain constant normal acceleration response capability, regardless of speed. Normal acceleration is the product of the speed and the rate of change of flight path angle. It follows, then, that in order to maintain the normal acceleration authority constant, the column input signal must vary inversely with speed.

The purpose of the lag circuit 60 will be explained in connection with the problem of providing the required display information to achieve satisfactory handling qualities for the short term pilot control loop.

The flight path error signal $\gamma_\epsilon$ is formed in the summer 64 by taking the difference between the flight path angle command and the signal GAMMA, representative of the actual flight path angle $\gamma$ of the aircraft. This signal GAMMA is earth referenced and may be obtained from well-known prior art sensing and computation sources. The $\gamma_\epsilon$ signal is used to command the elevator through a proportional signal path having a signal amplifier 66, providing signal amplification by a gain factor KGEP. The $\gamma_\epsilon$ signal is also processed in an integral signal path. For this purpose, a signal amplifier 68 provides amplification of the $\gamma_\epsilon$ signal by a gain factor KGEI. This amplified $\gamma_\epsilon$ signal is applied at one input to a summer 70, whose remaining input receives a signal corresponding to the first time differential of actual flight path, $\dot{\gamma}$, which is generated as described below. The summed signal out of summer 70 is integrated in an integrator 72.

The proportional $\gamma_\epsilon$ path provides the main elevator control command for reducing the $\gamma_\epsilon$ signal to zero. The $\gamma_\epsilon$ integral path is needed to assure that $\gamma_\epsilon$ will be nulled, even when a steady state elevator is to be carried, or when the need arises to offset null errors in other signal sources making up the elevator command.

A GAMD signal, which is gain weighted by a factor KGDI in an amplifier 74 before being summed with a gain weighted $\gamma_\epsilon$ signal in summer 70, is representative of the rate of change of the actual flight path angle. The signal GAMD is produced in a divider circuit 76 having as its numerator input a signal $\ddot{h}$ representative of aircraft vertical acceleration, produced by conventional vertical acceleration sensing means 78, and as its denominator the ground speed signal, as supplied by a conventional sensor 80. Thus, divider circuit 76 derives the $\dot{\gamma}$ signal from the relationship:

$$\dot{\gamma} = \ddot{h}/VGS. \tag{10}$$

The integral signal path of the GAMD signal is provided to offset the $\gamma_\epsilon$ signal integration after a change in $\gamma_C$. Integration of the $\gamma_\epsilon$ signal by itself would result in an overshooting of the $\gamma_C$ target during transient response, due to the fact that the integrator would otherwise have built up to the wrong value at the time the $\gamma_\epsilon$ signal crosses zero. By applying the GAMD signal as an input to integrator 72, the integration stops when:

$$(KGEI)(\gamma_\epsilon) + (KGDI)(GAMD) = 0 \tag{11}$$

or, in other words, when the appropriate rate of change of $\gamma$ is established.

The GAMD signal is also processed through a gain/lag circuit 82. The gain/lag circuit 82 has a gain factor KGDP, and a response lag $\tau_\gamma$. This proportional GAMD signal path provides the main damping term for control of the flight path angle dynamics. The lag filter cuts down high frequency noise generated by the vertical acceleration sensor 78.

The gain weighted $\gamma_\epsilon$ signal from amplifier 66, the output from integrator 72, and the gain weighted and filtered GAMD signal output from circuit 82 are summed in a summer 84 to form the outer loop flight path angle control signal.

Inner loop pitch damping is provided by the pitch rate signal $\dot{\theta}$ at input Q which is produced by a conventional aircraft pitch rate sensor 86. This $\dot{\theta}$ signal is processed through a washout circuit 88 to remove any undesirable steady state signal components. It is then amplified by a gain factor KQ in an amplifier 90. The resultant amplified signal is summed in a summer 92 with a gain weighted and filtered column signal COLP. This COLP signal effectively provides the pitch rate command for direct and smooth initiation of the transient maneuver for column input. It is derived from the speed programmed DCOLV signal to maintain coordination of the initial and steady state pitch rate for a given column input, over the entire desired speed range. Inasmuch as the $\dot{\gamma}_C/\delta_{COL}$ response is inversely proportional to ground speed VGS, and the steady pitch rate must be equal to the rate of change of $\gamma$, the pitch rate command per unit column input must also be inversely proportional to VGS. The COLP signal processing contains a small lag provided by lag circuit 94 to suppress signal noise, and a gain circuit 96, having a gain factor KDCP for providing the desired signal amplitude. Finally, the inner loop signal output from the summer 92 is gain programmed in a multiplier circuit 98 to provide uniform dynamics in the inner loop, which inner loop is affected by the elevator aerodynamic effectiveness. The elevator effectiveness (pitching moment per unit deflection) is a function of the calibrated airspeed, therefore calibrated airspeed, provided by conventional calibrated airspeed sensor 100, is programmed in a circuit 102 to generate a signal KV which is applied to multiplying circuit 98 to compensate for this speed effect. The output of the multiplier 98 is summed with the outer loop elevator command signal from the summer 84 in a summer 104 to form the total elevator command $\delta_{EC}$.

The remaining portion of the control law shown in FIG. 3 relates to the automatic GO AROUND feature. When the airplane descends to critical altitude and all conditions of runway vision, airplane position relative to the runway, or operation of all critical systems have not been met, the pilot must make a GO AROUND maneuver. This can be a critical maneuver at low altitude, demanding minimum altitude loss after the decision has been made. To assist the pilot in making this maneuver, the automatic GO AROUND feature has been designed into the velocity vector control wheel steering system control law. For this purpose, the commanded flight path angle $\gamma_C$ is quickly but smoothly changed from whatever previous value existed before the activation of the GO AROUND logic to a plus 2° climb-out value. This is done by taking the $\gamma_C$ signal and forming an error signal GAMEG relative to a plus 2° bias in a summer 110. The error signal GAMEG is appropriately amplified in an amplifier 112 by a gain factor KGAE and then fed back through a switch 114 to the summer 58, and ultimately to the command integrator 62. Activation of the GO AROUND ENGAGE logic (GAE) results in a temporary closure of switch 820 and, therefore, a quick but smooth synchronization of the $\gamma_C$ signal with the plus 2° climb bias. The airplane responds with a very positive and well controlled pull-up maneuver, and establishes the 2° climb angle without overshoot, just as in the case of a pilot controlled maneuver. For this purpose, the GO AROUND ENGAGE error signal GAMEG is fed back such that it not only changes the $\gamma_C$ value, but also results in a proportional pitch-up command which is summed with the pitch rate signal in the summer 92.

It should be understood that for proper functioning of the control law circuit shown in FIG. 3, all signal gains in each of the signal paths must be determined in relationship to the other gains. In addition, all gains and time constants must be selected for the particular aircraft being considered. The circuit of FIG. 3 is particularly adapted for producing a control response which exhibits a predetermined response lag $\tau$ between a commanded flight path angle $\gamma_C$ and an actual flight path angle $\gamma$, independent of flight conditions. Simulator analysis has shown that the response lag is largely determined by the relative gains of the $\gamma$ and $\dot{\gamma}$ feedback signals and the relative gain of $\dot{\theta}$ and the proportional column gain. The relative gains of $\gamma$ and $\dot{\gamma}$ were fixed in prior designs, but the absolute values were programmed down with speed, making this combination less effective at high speed, both for tracking control and for maintaining the desired fixed response lag. Whereas in prior designs the proportional column gain was programmed down with speed, it was not programmed down sufficiently to accomplish the desired fixed lag characteristic.

The circuit of FIG. 3 accomplishes the desired fixed lag characteristic by incorporating several design features. First, it is noted that the KV gain programmer 102 affects both pitch rate and proportional column gain, via multiplier 98. To maintain the desired inverse speed relationship between pitch rate $\dot{\theta}$ and the proportional column gain, the proportional column gain signal is replaced with a gain program column signal, via 56, at the front end of the control law. The result is decreasing pitch rate gain with increasing speed, thereby doubly decreasing proportional column gain and yielding relatively more response lag at high speed.

Further, it should be noted that the $\gamma$ and $\dot{\gamma}$ signals are excluded from the gain programmer KV. Since $$\gamma = \dot{h}/VGS \text{ and } \dot{\gamma} = \ddot{h}/VGS \quad (12)$$

these signals are by themselves programmed down with increasing speed and need no further gain programming. This way the $\gamma$ and $\dot{\gamma}$ gains remains constant and, therefore, more powerful in tracking $\gamma_C$. The higher $\gamma$ and $\dot{\gamma}$ gains also help to maintain a constant response lag with increasing speeds.

FIG. 4 illustrates the response of the control system shown in FIG. 3 under various conditions of flight. Notice that for each of the various flight conditions, the system exhibits a constant response lag $\tau$ between the commanded flight path angle $\gamma_C$ and the actual flight path angle $\gamma$, thereby accomodating the $\gamma_{SYNT}$ requirement as described above.

Referring again to FIG. 3, the signals $\gamma$ and $\gamma_C$ for the two symbol display, as illustrated in FIG. 1, are produced as shown.

Production of the $\gamma_{SYNT}$ signal is understood as follows. The pilot's control column signal $\delta_{COL}$, after being processed through dead-zone circuit 52, gain multiplier 54, summer 58 and gain/lag circuit 60, is coupled as an input to the gain and transfer circuit 120. Circuit 120 has a gain factor $\tau$ and a transfer function G(s). The transfer function G(s) is determined for a particular aircraft and control law and defines the relationship between the commanded flight path angle and the actual flight path angle response, which, in the circuit of FIG. 3, exhibits a fixed time lag $\tau$. Thus, in one embodiment of the invention, the function G(s) is a first order lag circuit, having a time constant $\tau$.

The gain factor $K_{COL}$ results from the gain factor $K_C$ and KDCI in the $\delta_{COL}$ signal processing path.

The output from circuit 120 is applied at one input of a summer 122, whose remaining input is the actual flight path angle signal $\gamma$. The resultant output from summer 122 is thus, the $\gamma_{SYNT}$ signal, in accord with equation (9) above.

Figure 5:
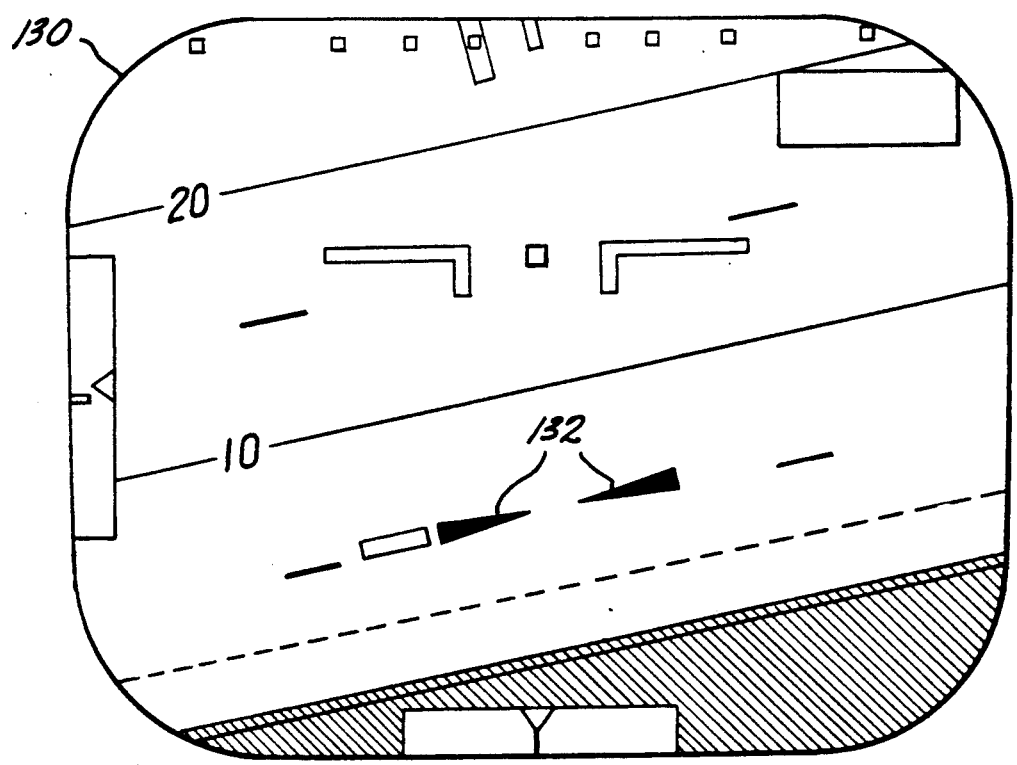

FIG. 5 illustrates a conventional cathode ray tube electronic attitude director indicator 130, having features identical to that of indicator 10 shown in FIG. 1, but here a single flight path angle display symbol 132 is used. The position of this symbol is a function of the generated $\gamma_{SYNT}$ signal, as produced by the circuit of FIG. 3. This $\gamma_{SYNT}$ display signal incorporates most of the information of the dual $\gamma/\gamma_C$ as shown in FIG. 1 and has quickened response dynamics required to produce a satisfactory $\gamma$-control handling quality.

The only information not available in $\gamma_{SYNT}$ is the control reference value $\gamma_C$ during steady tracking. The $\gamma_C$ signal is useful in turbulence since it is unaffected by turbulence. Its display allows the pilot to precisely set up the desired long term $\gamma$ and reduces the pilot's temptation to enter the control loop in a futile attempt to stabilize $\gamma$ perturbations due to turbulence.

In summary, a novel flight path angle control and display system combination has been described. The system produces a single quickened flight path angle display signal ($\gamma_{SYNT}$) eliminating the need for the display of both actual and commanded flight path angle, thereby reducing display symbology clutter and the likelihood of pilot confusion.

While the preferred embodiment of the invention has been described in detail, it should be apparent that many modifications and variations thereto are possible, all of which fall within the true spirit and scope of the invention.

The embodiments of the invention in which an exclusive property privilege is claimed are defined as follows:

1. A method of producing a flight path angle display for an aircraft, the method comprising the steps of:
   (a) providing an aircraft flight control steering system having a predetermined time response lag $\tau$ to a command input, said time response lag being substantially independent of flight conditions;
   (b) providing a signal $\gamma$ representative of the aircraft's actual flight path angle;
   (c) producing a signal $\Delta\gamma_D$ having a predetermined relationship to said response lag $\tau$ and to a flight path angle command;
   (d) producing a synthesized signal $\gamma_{SYNT}$, where:

$$\gamma_{SYNT} = \gamma + \Delta\gamma_D;$$

and,
   (e) displaying said $\gamma_{SYNT}$ signal.

2. The method of claim 1 wherein step (c) comprises the steps of:
   (i) providing a signal $\dot{\gamma}_C$ representative of the rate of change of a commanded flight path angle;
   (ii) producing a signal $\tau\dot{\gamma}_C$, where $\tau$ is representative of said time response lag;
   (iii) processing said $\tau\dot{\gamma}_C$ signal by a predetermined fixed transfer function G(s), where G(s) is representative of the transfer function between a commanded flight path angle and the aircraft's actual flight path angle, to produce said $\Delta\gamma_D$ signal.

3. The method of claim 2 wherein step (c) (i) comprises the steps of:
   providing a signal $\delta_{COL}$ representative of a deflection of the pilot's control column; and
   producing said $\dot{\gamma}_C$ signal as $$\dot{\gamma}_C = K_{COL}\delta_{COL},$$

where $K_{COL}$ is a predetermined gain constant.

4. The method of either one of claims 2 or 3 wherein in step (c) (iii) the transfer function G(s) is a lag function.

5. An aircraft flight path control and display system comprising:
   control means responsive to a flight path command to automatically control the flight of the aircraft to the commanded path, the control means exhibiting a time response lag $\tau$ between a flight path command input and the aircraft's actual flight path response, said time lag $\tau$ being substantially a constant value, independent of flight conditions;
   means for providing a signal $\gamma$ representative of the aircraft's actual flight path angle;
   means for producing a signal $\Delta\gamma_D$ which is a predetermined function of said response lag $\tau$ and the first time derivative of the commanded flight path angle $\dot{\gamma}_C$;
   means for producing a synthesized signal $\gamma_{SYNT}$ where $\gamma_{SYNT} = \gamma + \Delta\gamma_D$; and
   display means for displaying said $\gamma_{SYNT}$ signal.

6. The system of claim 5 wherein the means for producing the signal $\Delta\gamma_D$ comprises:
   means for producing a signal $\dot{\gamma}_C$ representative of the first time derivative of a commanded flight path angle $\dot{\gamma}_C$;
   means for processing said $\dot{\gamma}_C$ signal by a gain factor $\tau$ representative of said time response lag and a predetermined function G(s), where G(s) defines the transfer function between a commanded flight path angle and the aircraft's actual flight path angle, thereby producing a signal $$\Delta\gamma_D = \tau\dot{\gamma}_C G(s).$$

7. The system of claim 6 wherein the means for producing said signal $\dot{\gamma}_C$ comprises:

means for producing a signal $\delta_{COL}$ representative of a deflection of the pilot's control column;

means for multiplying said $\delta_{COL}$ signal by a predetermined factor $K_{COL}$, such that said $\dot{\gamma}_C$ signal is produced as $$\dot{\gamma}_C = K_{COL}\delta_{COL}.$$

8. The system of either one of claims 6 or 7 wherein the predetermined function $G(s)$ is a lag function.

* * * * *